US 12,423,705 B2

United States Patent
Simons et al.

(10) Patent No.: US 12,423,705 B2
(45) Date of Patent: Sep. 23, 2025

(54) FINGERPRINTING ACCOUNT ACTIVITY HABITS IN ORDER TO DISCOVER FRAUDULENT USAGE

(71) Applicant: Surescripts, LLC, Arlington, VA (US)

(72) Inventors: Bradley Carter Simons, Rosemount, MN (US); Robert Driskill, Greenfield, MN (US)

(73) Assignee: Surescripts, LLC, Arlington, VA (US)

( * ) Notice: Subject to any disclaimer, the term of this patent is extended or adjusted under 35 U.S.C. 154(b) by 125 days.

(21) Appl. No.: 18/312,992

(22) Filed: May 5, 2023

(65) Prior Publication Data

US 2024/0370873 A1   Nov. 7, 2024

(51) Int. Cl.
*G06Q 20/40*   (2012.01)
(52) U.S. Cl.
CPC .................. *G06Q 20/4016* (2013.01)
(58) Field of Classification Search
CPC .................................. G06Q 20/4016
See application file for complete search history.

(56) References Cited

U.S. PATENT DOCUMENTS

| 10,776,890 | B1* | 9/2020 | Samarin | G06Q 50/22 |
| 2014/0257846 | A1* | 9/2014 | Hermiz | G06Q 40/08 |
| | | | | 705/2 |
| 2020/0143925 | A1* | 5/2020 | King | G16H 20/10 |
| 2022/0084037 | A1* | 3/2022 | Fang | G06Q 20/4016 |

* cited by examiner

*Primary Examiner* — Scott S Trotter
(74) *Attorney, Agent, or Firm* — WEAVER IP L.L.C.

(57) ABSTRACT

Methods, systems, apparatuses, and computer program products for discovering fraudulent account usage are disclosed. In an example, a database is queried to identify a list of accounts and transaction categories. A first table is generated based on the transaction categories. A second table is generated by populating the first table based on a response to querying the database for a first set of historical transactions over a first period of time. A third table is generated by populating the first table based on a response to querying the database for a second set of historical transactions over a second period of time. A measure of similarity for each of the accounts is generated based on the second table and the third table. For each account with a corresponding measure of similarity below a threshold, the account is identified as a fraudulent account candidate.

20 Claims, 6 Drawing Sheets

FINGERPRINTING ACCOUNT ACTIVITY HABITS IN ORDER TO DISCOVER FRAUDULENT USAGE

BACKGROUND

Account impersonation is a growing concern in many industries. Once an account is impersonated, many weeks may pass before the impersonation is discovered, which can result in a significant amount of fraudulent activity associated with the improper usage. In a medical field, for instance, account impersonation may occur where an unauthorized user accesses a medical provider's account to generate drug prescriptions. However, adequate measures to detect such types of inappropriate usage do not exist, potentially resulting in many weeks of prescriptions that are generated and filled until the behavior is detected.

BRIEF SUMMARY

Methods, systems, and apparatuses are described for discovering fraudulent account usage, substantially as shown and/or described herein in connection with at least one of the figures, as set forth more completely in the claims. In an example, a database is queried to identify a list of accounts and transaction categories, where the database contains a history of transactions associated with each of the accounts. A first table is generated based on the transaction categories. A second table is generated by populating the first table based at least on a response to querying the database for a first set of historical transactions associated with each of the accounts across each of the transaction categories over a first period of time. A third table is generated by populating the first table based at least on a response to querying the database for a second set of historical transactions associated with each of the accounts across each of the transaction categories over a second period of time. In one example, the first period of time is longer than the second period of time. A measure of similarity for each of the accounts is generated based at least on the second table and the third table. For each account with a corresponding measure of similarity below a threshold value, the account is identified as a fraudulent account candidate.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Embodiments will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. The use of "or" herein may be interchangeable with the term "and/or" unless otherwise stated.

If the performance of an operation is described herein as being "based on" one or more factors, it is to be understood that the performance of the operation may be based solely on such factor(s) or may be based on such factor(s) along with one or more additional factors. Thus, as used herein, the term "based on" should be understood to be equivalent to the term "based at least on."

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

If the performance of an operation is described herein as being "based on" one or more factors, it is to be understood that the performance of the operation can be based solely on such factor(s) or can be based on such factor(s) along with one or more additional factors. Thus, as used herein, the term "based on" should be understood to be equivalent to the term "based at least on."

Still further, it should be noted that the drawings/figures are not drawn to scale unless otherwise noted herein.

Numerous exemplary embodiments are now described. Any section/subsection headings provided herein are not intended to be limiting. Embodiments are described throughout this document, and any type of embodiment may be included under any section/subsection. Furthermore, it is contemplated that the disclosed embodiments may be combined with each other in any manner. That is, the embodiments described herein are not mutually exclusive of each other and may be practiced and/or implemented alone, or in any combination.

II. Example Embodiments

The present subject matter relates to discovering fraudulent account usage based on account activity habits observed over a period of time. Embodiments provide for methods, systems, and apparatuses for identifying fraudulent account candidates where a transaction history pattern deviates from a normal pattern observed over the time period, which can allow for improved detection of fraudulent account usage. The example techniques and embodiments described herein may be adapted to various types of systems and devices, for example but without limitation, computing systems such as personal computers/computing devices, servers, enterprise computing systems, cloud-based platforms, etc. that are accessed by accounts to perform various tasks (e.g., authorize services, medications, payments, etc.), in accordance with embodiments. For instance, computing systems that communicate over a network that are accessed by such accounts to perform various types of tasks may be configured according to the described embodiments and techniques.

While the embodiments herein may be described with respect to various computing systems and implementations as conceptual and/or illustrative examples for descriptive consistency, other types of electronic and communication devices and implementations are also contemplated for implementing the disclosed techniques. It is contemplated herein that in various embodiments and with respect to the illustrated figures of this disclosure, one or more components described and/or shown may not be included and that additional components may be included.

Account impersonation is a growing concern in many industries. Once an account is impersonated, many weeks may pass before the impersonation is discovered, which can result in a significant amount of fraudulent activity associated with the improper usage. In a medical field, for instance, account impersonation may occur where an unauthorized user accesses a medical provider's account to generate drug prescriptions. However, adequate measures to detect such types of inappropriate usage do not exist, potentially resulting in many weeks of prescriptions that are generated and filled until the behavior is detected In a typical scenario, account fraud is discovered when an individual (e.g., a vendor, a pharmacy, an employee) identifies the potential fraud. However, with the length of time it takes to investigate fraudulent activity (which can be weeks), and that many types of fraudulent activity only occur for a few days weeks before the account is abandoned by the fraudulent actor, use of the fraudulent account remains unrestricted for a prolonged period of time. This can result in activity being generated in connection with the fraudulent account over various computing systems and/or networks in which the account has access, as well as other potentially detrimental effects (e.g., writing and filling of medications that were not authorized).

Embodiments described herein address these and other issues by providing methods, systems, apparatuses, and computer program products for discovering fraudulent account usage, substantially as shown and/or described herein in connection with at least one of the figures, as set forth more completely in the claims. In an example, a database is queried to identify a list of accounts and transaction categories, where the database contains a history of transactions associated with each of the accounts. A first table is generated based on the transaction categories. A second table is generated by populating the first table based at least on a response to querying the database for a first set of historical transactions associated with each of the accounts across each of the transaction categories over a first period of time. A third table is generated by populating the first table based at least on a response to querying the database for a second set of historical transactions associated with each of the accounts across each of the transaction categories over a second period of time. In one example, the first period of time is longer than the second period of time. A measure of similarity for each of the accounts is generated based at least on the second table and the third table. For each account with a corresponding measure of similarity below a threshold value, the account is identified as a fraudulent account candidate.

The techniques described herein have numerous advantages, including but not limited to overall improvement of the functioning of the computing devices in transactions are received and/or processed. For instance, the disclosed techniques utilize historically observed transactional behaviors associated with an account to determine whether a current behavior associated with the same account is potentially fraudulent. Once such a determination is made, a fraudulent account identification can be made and/or the fraudulent account may be disabled, thereby preventing the account from generating additional transactions for transmission to and/or processing by various computing devices. By reducing the number of transactions (e.g., transactions associated with fraudulent accounts), these computing devices have a reduced overall number of transactions to retrieved and/or process, thereby preserving at least processing and/or memory resources. In addition, by reducing the number of such transactions, network resources are also preserved (e.g., by reducing the overall amount of transactional information that is transmitted between various computing devices). Thus, disclosed techniques relate to improvements in at least processing, storage, and network resources of computing devices in which transactions are received and/or processed.

Furthermore, in accordance with the disclosed techniques, the identification of fraudulent accounts may be determined in real-time or near real-time (e.g., within a day or a few days), enabling the preservation of resources in a quicker fashion. In other words, behaviors may be modeled and current behaviors may be analyzed based on the observed behaviors such that account activities may be suspended within a day or a few days, rather than weeks or even months compared to other techniques.

Figure 1:
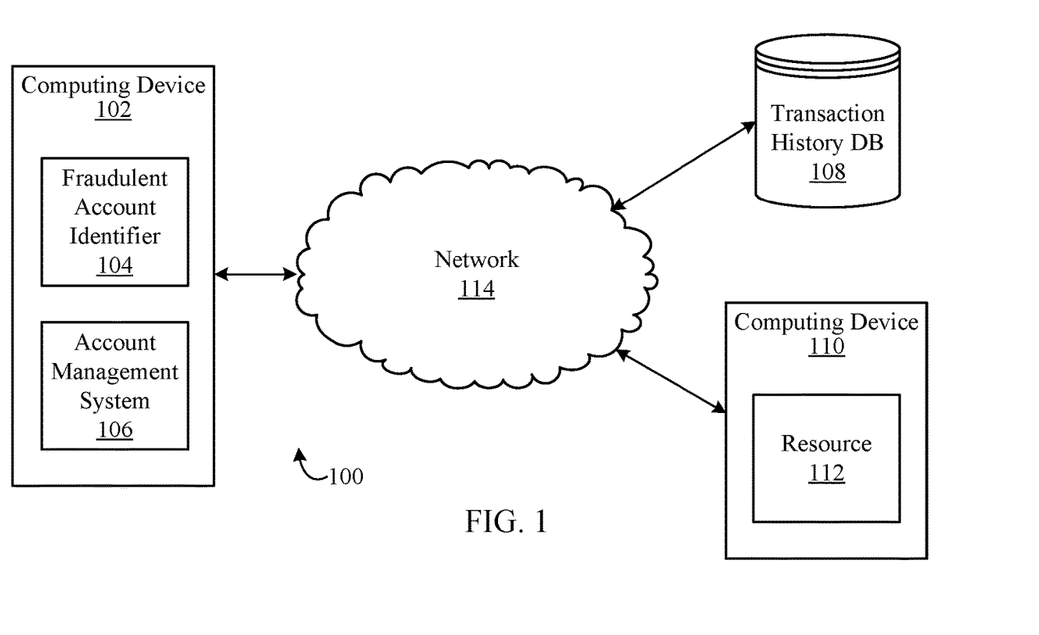
FIG. 1 shows a block diagram of a system for discovering fraudulent account usage, according to an example embodiment.

Example embodiments are described as follows for systems and methods for identifying fraudulent accounts. For instance, FIG. 1 shows a block diagram of a system 100 for discovering fraudulent account usage, according to an example embodiment. As shown in FIG. 1, system 100 includes a computing device 102, a transaction history database (DB) 108, and a computing device 110. Computing device 102 includes a fraudulent account identifier 104 and an account management system 106. Computing device 110 includes a resource 112. Computing device 102, transaction history DB 108, and computing device 110 may be communicatively coupled or linked to each other via a network 114. An example computing device that may incorporate the functionality of computing device 102, transaction history DB 108, and computing device 110 (or any subcomponents therein, whether or not illustrated in FIG. 1) is described below in reference to FIG. 7. It is noted that system 100 may comprise any number of devices, including those illustrated in FIG. 1 and optionally one or more further devices or components not expressly illustrated. System 100 is further described as follows.

Network 114 may comprise at least one network and/or direct connection (i.e., a communication link), or any combination thereof. That is, network 114 may be any combination of the Internet, the "cloud", direct communication links, business and/or enterprise networks, and/or the like. In examples, network 114 is configured to communicatively couple computing device 102, transaction history DB 108, and/or computing device 110 to each other. In some embodiments, such as cloud-based implementations, computing device 102, transaction history DB 108, and/or computing device 110 may be implemented as a service or application via network 114.

Computing device 102 includes one or more devices from which accounts for use in system 100 are managed. In examples, account management system 106 may comprise an application (e.g., software) and/or a user interface that enables users (e.g., administrators) to create, modify, disable, remove, etc. an account (including permissions thereof). Each account, for instance, may allow a user to access resource 112 to execute a task. In some implementations, account management system 106 provides an interface in which historical transactions associated with one or more accounts may be accessed and/or viewed. In another implementation, account management system 106 provides an interface in which permitted and/or prohibited tasks are defined for each account. For instance, if the account is a medical provider account, account management system 106 may be used to define the types of medical services and/or prescriptions that the account is permitted to authorize.

In some implementations, account management system 106 may comprise an interface for reviewing an account to determine whether the account has been fraudulently accessed or impersonated. For instance, prior transaction information associated with the account may be reviewed to determine if anomalous behavior is present. In some implementations, account management system 106 may receive an indication (e.g., from fraudulent account identifier 104) that a given account is potentially fraudulent based on observed behaviors. In such an example, account management system 106 may provide one or more interactive features, that when selected, allow an administrator to disable an account from accessing resource 112, thereby preventing the account from generating further transactions. In some implementations, account management system 106 may allow the administrator one or more interactive elements to configure the operation of fraudulent account identifier 104, such as by identifying different thresholds, rules and/or metrics by which fraudulent accounts are identified. As used herein, an account comprises an identifier (e.g., a string of characters and/or numbers) that is uniquely associated with an entity (e.g., a user). In some examples, the account is used to access a resource to complete a transaction (e.g., a prescription system, a financial resource, etc.).

In various embodiments, fraudulent account identifier 104 is configured to analyze a history of transaction associated with each account to generate a data structure indicative of a transaction behavior for the account. In some implementations, the data structure indicative of the transaction behavior for each account represents a long term behavior (e.g., a behavior aggregated over a year). In various embodiments, fraudulent account identifier is also configured to generate an additional data structure indicative of a short term transaction behavior (e.g., behavior aggregated over a day, several days less than a week, a full week, etc.). Fraudulent account identifier 104 may compare these two data structures (e.g., using a cosine similarity) and determine whether the short term behavior (e.g., current behavior) is consistent with the long term behavior, or whether the short term behavior has deviated from the long term behavior more than a threshold amount. Based on such a determination, additional rules and/or heuristics may be applied to determine whether a potentially fraudulent account should be the subject of a notification provided to account management system 106 and/or deactivated (e.g., automatically or with a user input). Additional examples and details regarding the operation and/or functionality of fraudulent account identifier 104 (as well as other components described herein) are provided below.

Transaction history DB 108 comprises a database stored on any set of storage and/or memory devices, located local and/or located remotely (e.g., as a cloud storage) to computing device 102 and/or computing device 110 for logging and/or storing a history of transactions associated with each account. In examples, the history identifies a resource that was also accessed and/or utilized. In some example implementations, each transaction indicates the account for which the transaction is associated, a time and/or date of the transaction, a name (e.g., a brand name and/or a generic name) or type of transaction, a category of the transaction, numerical values associated with the transaction (e.g., a monetary amount and/or quantity of a product sold, authorized, prescribed, etc.), and any other information associated with a transaction as should be appreciated by those skilled in the relevant arts. In some examples, transaction history DB 108 comprises a history of transactions for each account defined in account management system 106 and/or for each resource provided by computing device 110.

Transaction history DB 112 may store a transaction history in any fashion, including but not limited to using one or more databases, files, documents, etc. In some examples, transaction history DB 112 may store information in a raw form (e.g., unprocessed). In other examples, transaction history DB 112 may store information in a processed form, such as by aggregating certain values over one or more time periods.

Computing device 102 includes one or more devices in which resource 112 is maintained and/or made accessible for use by accounts associated with one or more users. Computing device 102 may comprise a collection of computing devices, a server device, a service executing on the cloud, etc. Resource 112 comprises a service (which can include software, an interface, a portal, etc.) accessed by one or more accounts to initiate or execute a transaction. In examples, computing device 110 may validate or authenticate an account's credentials (e.g., a username, identifier, password, etc.) before granting access to resource 112. In one illustration, resource 112 comprises a service accessed by one or more accounts for authorizing and/or prescribing medical services, such as drug or other medical prescriptions, outpatient medical procedures, inpatient medical procedures, medical equipment, etc. These examples are only illustrative, and it should be understood that resource 112 may comprise any other type of resource accessed by account in accordance with the disclosed techniques. For instance, disclosed techniques may be implemented to detect changes in behaviors in various other contexts, such as to identify changes in behaviors with respect to patient deviating from medication instructions, identifying patients with a similar medical diagnoses but different outcomes, identifying changes in third party (e.g., contractors, vendors, etc.) behaviors, etc.

Figure 2:
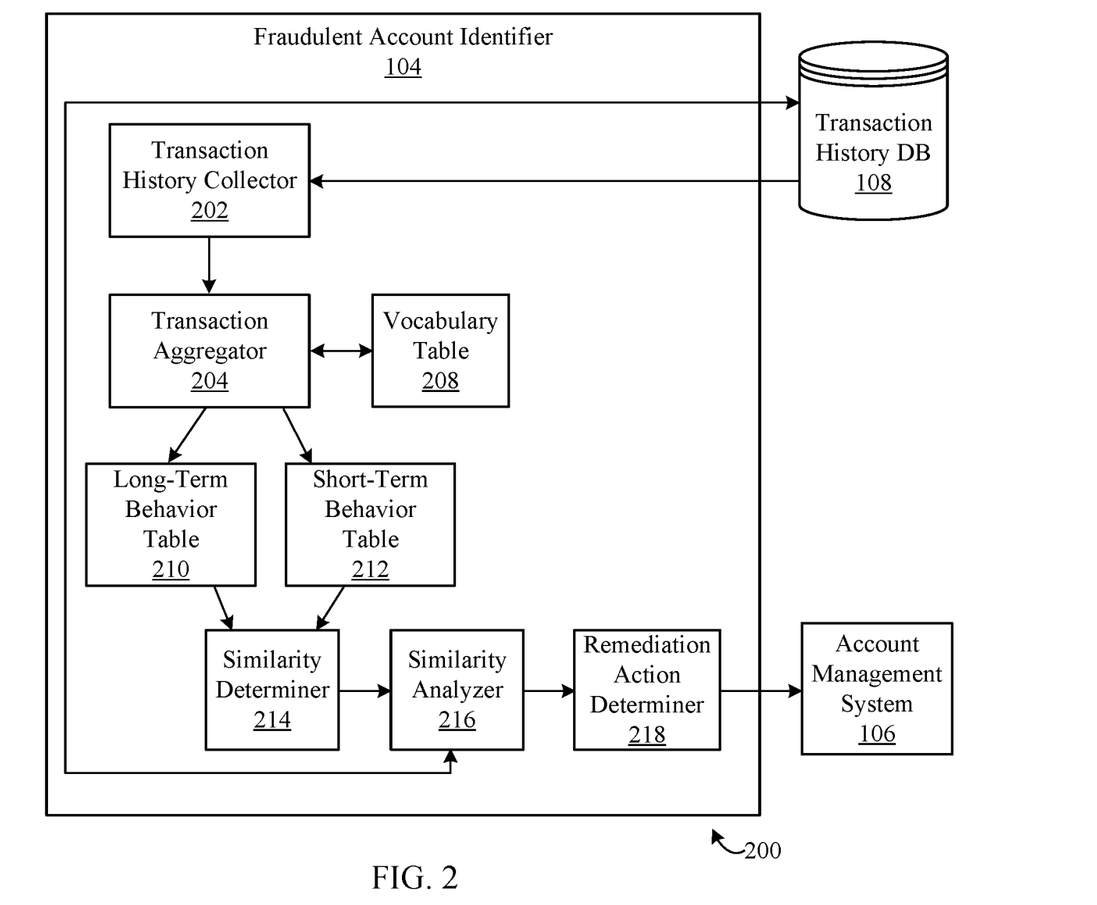
FIG. 2 shows a block diagram of a system for discovering fraudulent account usage, in accordance with another example embodiment.

FIG. 2 depicts a block diagram of a system 200 for discovering fraudulent account usage, in accordance with another example embodiment. As shown in FIG. 2, system 200 includes an example implementation of fraudulent account identifier 104, account management system 106, and transaction history DB 108. As shown in FIG. 2, fraudulent account identifier 104 includes a transaction history collector 202, a transaction aggregator 204, a vocabulary table 208, a long-term behavior table 210, a short-term behavior table 212, a similarity determiner 214, a similarity analyzer 216, and a remediation action determiner 218. In accordance with an embodiment, each of transaction history collector 202, transaction aggregator 204, vocabulary table 208, long-term behavior table 210, short-term behavior table 212, similarity determiner 214, similarity analyzer 216, and remediation action determiner 218 are implemented in fraudulent account identifier 104 (e.g., on computing device 102). In accordance with another embodiment, one or more of transaction history collector 202, transaction aggregator 204, vocabulary table 208, long-term behavior table 210, short-term behavior table 212, similarity determiner 214, similarity analyzer 216, and remediation action determiner 218 are implemented across a plurality of computing devices or servers. Account management system 106 and/or transaction history DB 108 may also be implemented within (e.g., local to) fraudulent account identifier 104 or may be implemented in a remotely located device or devices.

In examples, transaction history collector 202 is configured to query transaction history DB 108 to obtain transaction history information relating to one or more accounts. As described above, transaction history DB 108 comprise a history of transactions associated with each account. In one implementation, transaction history collector 202 queries transaction history DB 108 to identify a list of each account (e.g., active and/or inactive accounts) authorized to access resource 112. In some implementations, transaction history collector 202 queries transaction history DB 108 to identify one or more transaction categories (e.g., a product or drug classification, a product or drug code, etc.).

Transaction aggregator 204 is configured to aggregate transaction history information obtained by transaction history collector 204. For instance, transaction aggregator 204 may aggregate transactions occurring over one or more time periods and/or transactions falling into a same category. In some implementations, transaction aggregator 204 may aggregate the transaction categories to determine an aggregated set of transaction categories (e.g., grouping certain categories into a single combined category). These examples are only illustrative, and transaction aggregator 204 may aggregate any information obtained by transaction history collector 204 in various ways.

In various other implementations, transaction aggregator 204 may be configured to query transaction history DB 108 in a manner that transaction aggregator 204 retrieves a set of aggregated information (rather than raw transactional information). For instance, transaction aggregator 204 may be configured to query the database to identify a total number of transactions associated with an account over a given timeframe (e.g., a day, week, year, etc.) across a plurality of different groups (e.g., transaction categories). In this manner, less data may be retrieved from the database in generation of the vocabulary table, long-term behavior table, and short-term behavior table. For instance, the database may contain hundreds or more transactions for a given antibiotic (e.g., amoxicillin, which may be manufactured by many different entities and/or have different variations) associated with a single account. Rather than retrieving all of the transactions, transaction aggregator 204 may query the database to determine a total number of transactions for a transaction category of amoxicillin (e.g., using drug classification and/or drug codes), thereby reducing the amount of data transmitted (which can further reduce the amount of processing needed in later phases).

In some embodiments, the aggregation performed for a long-term behavior table may be different than the aggregation performed for a short-term behavior table. For instance, for long-term behaviors, a greater degree of aggregation may be implemented. For example, the short-term behavior table may aggregate a total number of transactions in a given time period for each account and its corresponding location (e.g., geographic location), while the long-term behavior table may aggregate a total number of transactions in a different time period for each account irrespective of the location. This is only one example, and other differences in aggregation may be performed as appreciated by those skilled in the relevant arts.

In examples, transaction aggregator 204 is configured to generate, from information contained in transaction history DB 108, vocabulary table 208. In an implementation, vocabulary table 208 comprises a data structure (e.g., a table, listing, matrix, etc.) that identifies one or more transaction categories. In some example embodiments, the transaction categories are derived from one or more data sources that categorize and/or classify products and/or services. For example, in various implementations, the one or more categories may be predefined (e.g., a predefined listing of drug categories or drug codes). In some examples, the one or more transaction categories included in vocabulary table 208 comprise an aggregated categories of transactions (e.g., categories based on an aggregation of different drug classifications and/or drug codes). In various implementations, the transaction categories included in vocabulary table 208 identifies a listing of categories that encompasses all possible transactions stored in transaction history DB 108. For instance, the transaction categories may be generated separate from a history of transactions, but may be generated in such a manner as to include all possible categories of transactions that may have occurred. In some further examples, vocabulary table 208 may also identify each account (e.g., by an account identifier or other suitable identifier).

In examples, transaction aggregator 204 generates long-term behavior table 210 and short-term behavior table 212. Long-term behavior table 210 may comprise a populated version of vocabulary table 208. For instance, transaction aggregator may generate long-term behavior table 210 that indicates, for each account, an aggregated quantity of transactions for each transaction category identified in vocabulary table 208. In various embodiments, long-term behavior table 210 comprises transaction information aggregated over a first time period (e.g., one year) indicative of a long-term usage associated with an account (e.g., a normal or typical behavior). Short-term behavior table 212 may be generated in a similar manner as long-term behavior table 210 (e.g., by populating vocabulary table 208). However, short-term behavior table 212 may comprise transaction information aggregated over a second time period (e.g., a day, two days, a week), shorter than the first time period, that is indicative of a short-term or current usage associated with the account. In this manner, short-term behavior table 212 may represent a relatively recent usage of the account, while long-term behavior table 210 may represent a long-term usage of the same account. In examples, long-term behavior table 210 and short-term behavior table 212 may comprise aggregated transaction information for a plurality of accounts.

In an implementation, similarity determiner 214 may compare long-term behavior table 210 and short-term behavior table 212 for each account, and generate measures of similarity based thereon. In some implementations, the measure of similarity comprises a cosine similarity. By comparing each account's long-term behavior and short-term behavior, a determination may be made with respect to how similar a current usage of the account is compared to a typical usage of the same account over a longer period of time. Where the measure of similarity for a given account is below a threshold (i.e., indicating that the short-term behavior deviates from the long-term behavior), similarity determiner 214 may indicate that the account is potentially being impersonated (e.g., being used fraudulently).

Similarity analyzer 216 may be configured to further analyze or analyze one or more accounts that are identified as potentially being impersonated. For instance, similarity analyzer 216 may obtain additional transactional information for each such account and apply one or more rules and/or heuristics to assign a ranking (e.g., a severity score) indicative of a likelihood that the account is being impersonated. Illustrative examples and details regarding such rules and/or heuristics are described in greater detail below.

Remediation action determiner 218 may determine, for each account that is potentially being impersonated (e.g., a fraudulent account candidate), one or more remediation actions. The remediation action may comprise a task that is intended to remediate the improper usage of a given account. For instance, the remediation action comprise generating a notification for transmission to account management system 106 to indicate (e.g., in a user interface, in a message, in an e-mail, etc.) that a particular account (and/or its corresponding measure of similarity) is potentially being impersonated and/or should be reviewed. In another implementation, the remediation action comprises transmitting an indication to account management system 106 to deactivate or suspend an account (e.g., automatically or with a user input) based on its corresponding measure of similarity, to prevent further usage of the account. In another implementation, the remediation action may comprise adding the account to a list of accounts to be further monitored. These actions are only illustrative, and other types of remediation actions are also contemplated in accordance with the disclosed techniques.

Implementations are not limited to the illustrative arrangement shown in FIG. 1 or 2. For instance, the components (or subcomponents) shown therein may be located or remotely from each other, or may be combined together and/or accessible via the same computing device or distributed across a plurality of devices. In some implementations, techniques described herein may be implemented in a single computing device. Furthermore, the foregoing systems may comprise any number of other devices (e.g., databases, storage devices, networks, servers, and/or computing devices) coupled in any manner in accordance with the disclosed techniques.

Figure 3:
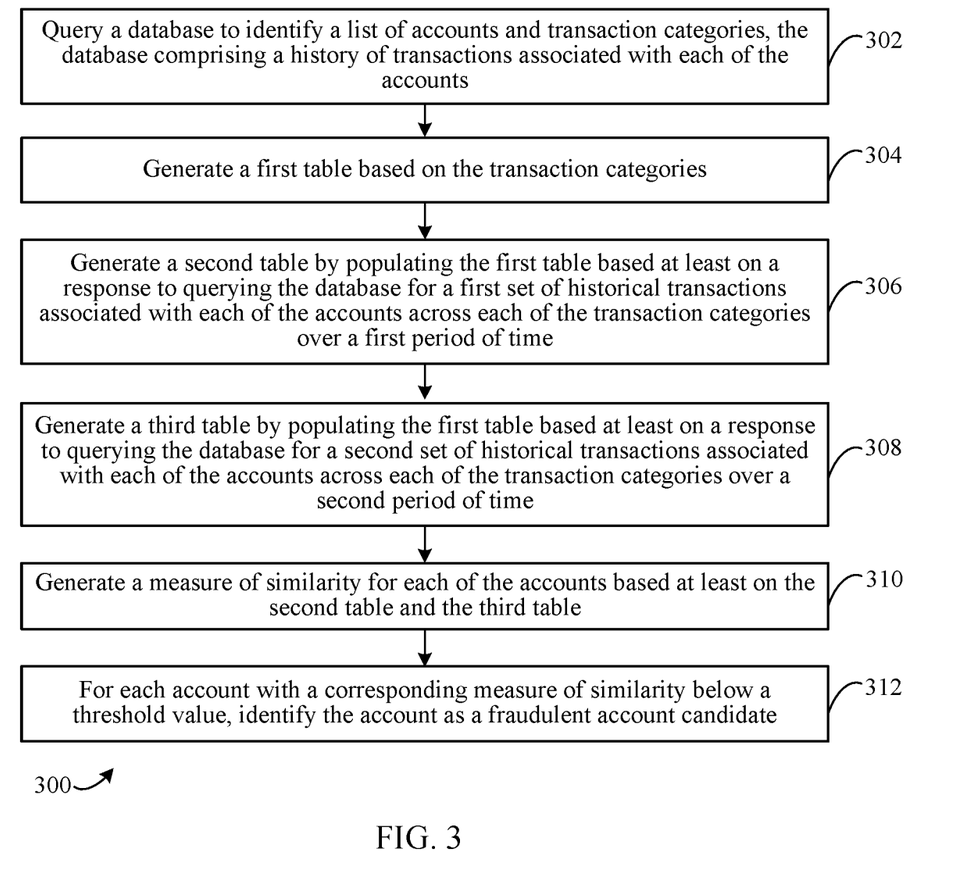
FIG. 3 shows a flowchart of a method for identifying fraudulent account candidates, in accordance with an example embodiment.

Turning now to FIG. 3, a flowchart 300 is shown for a method for identifying fraudulent account candidates, in accordance with an example embodiment. Further structural and operational examples will be apparent to persons skilled in the relevant art(s) based on the following descriptions. Flowchart 300 is described as follows with respect to system 100 of FIG. 1 and system 200 of FIG. 2. In embodiments, one or more steps of flowchart 300 may not be performed.

Flowchart 300 begins with step 302. In step 302, a database is queried to identify a list of accounts and transaction categories, where the database comprises a history of transactions associated with each of the accounts. For instance, with reference to FIG. 2, transaction history collector 202 is configured to query transaction history DB 108 to identify a list of accounts and transaction categories. In examples, transaction history DB 108 comprises a history of transactions associated with each of the accounts. For instance, transaction history DB 108 may store information associated with each transaction taking place in system 100 in a log, database, other suitable data structure. In examples, transaction history DB 108 may also store a corresponding category (or categories) associated with each transaction, which may indicate a type of the transaction, a classification of the transaction, a transaction code, etc.

In an example implementation, the list of accounts comprises a list of medical provider accounts, such as a list of drug prescriber accounts. For instance, the list of accounts may comprise a National Provider Identifier (NPI) or other unique assigned to a medical provider for authorization or prescription of medical services and/or products. In one embodiment, the historical transactions stored in transaction history DB 108 comprises prescriptions (or other medical transactions) associated with one or more of the drug prescriber accounts. In a further embodiment, the transaction categories may comprise drug classifications and/or drug names associated with each transaction (e.g., each prescription). In a further embodiment, the transaction categories may comprise an aggregated list of drug classifications and/or drug names.

In step 304, a first table is generated based on the transaction categories. For instance, with reference to FIG. 2, transaction aggregator 204 is configured to generate a first table (i.e., vocabulary table 208) based on the transaction categories. Vocabulary table 208 may comprise a table that contains a list of categories across all possible transactions. In various implementations, the categories in vocabulary table 208 comprises an aggregated list of categories. For instance, transaction aggregator 204 may group certain categories together in generating vocabulary table 208. In various implementations, vocabulary table 208 comprises a table that is not populated with a quantity of transactions falling into each category by each account. In some further examples, vocabulary table 208 comprises a listing of each account identified by transaction history collector 202. In one example embodiment, the vocabulary table may identify accounts in a first column of the table, and transaction categories in a first row of the table (or vice versa).

As an illustration, transaction history collector 202 may identify different classifications and/or drug names for certain types of medications (e.g., antibiotics). In generating vocabulary table 208, transaction aggregator 204 may combine various different classifications and/or drug names into a single aggregated category. Such aggregation when generating vocabulary table 208 enables a reduced size of vocabulary table 208, which allows for a reduced utilization of computing resources (e.g., processing resources and/or storage resources) when the vocabulary table is subsequently used to identify fraudulent account candidates. This example is only illustrative, and other types of aggregation are also contemplated.

In step 306, a second table is generated by populating the first table based at least on a response to querying the database for a first set of historical transactions associated with each of the accounts across each of the transaction categories over a first period of time. For instance, with reference to FIG. 2, transaction aggregator 204 is configured to generate a second table (i.e., long-term behavior table 210) based at least on a response to querying transaction history DB 108 for a first set of historical transactions associated with each of the accounts across each of the transaction categories (e.g., each of the transaction categories identified in vocabulary table 208). In various implementations, the first set of historical transactions corresponds to a first period of time (e.g., a year) indicative of a long-term or typical behavior of each account. In examples, based at least on the querying, transaction aggregator 204 populates vocabulary table 208 to generate long-term behavior table 210. As a result, long-term behavior table 210 comprises a populated version of vocabulary table 208 that includes, for each account, an amount (e.g., quantity) of transactions for each of the different transaction categories specified therein.

In step 308, a third table is generated by populating the first table based at least on a response to querying the database for a second set of historical transactions associated with each of the accounts across each of the transaction categories over a second period of time. For instance, transaction aggregator 204 may be configured to generate a third table (i.e., short-term behavior table 212) by populating vocabulary table 208 based at least on a response to querying the transaction history DB 108 for a second set of historical transactions associated with each of the accounts across each of the transaction categories (e.g., each of the transaction categories identified in vocabulary table 208). In examples, short-term behavior table 212 is generated in a similar fashion as long-term behavior table 210, with the exception that short-term behavior table 212 contains transaction information for a second set of historical transactions corresponding to a second time period that is shorter than the first time period. In examples, the second time period is indicative of a short-term behavior (e.g., a current or recent usage) associated with each account. In this manner, short-term behavior table 212 comprises information indicative of relatively recent behavior of each account (e.g., prescription transactions in the past day or week).

In some implementations, the second time period is non-overlapping with the first time period. For instance, if the first time period comprises 52 weeks of past transaction information (e.g., December 31 to January 1), the second time period may comprise up to a week of the most recent transactions (e.g., from January 2 to January 8) that are not encompassed by the first time period. These examples are only illustrative, and other time periods may also be utilized in accordance with the disclosed techniques.

It should be understood that although examples described herein describe vocabulary table 208, long-term behavior table 210, and short-term behavior table 212 as "tables," implementations are not so limited. Rather, a table as utilized in this context comprises any suitable data structure (e.g., a matrix, a listing, a document, a spreadsheet, a database, etc.).

In step 310, a measure of similarity is generated for each of the accounts based at least on the second table and the third table. For instance, with reference to FIG. 2, similarity determiner 214 is configured to generate, for each of the accounts in long-term behavior table 210 and short-term behavior table 212, a measure of similarity. The measure of similarity for each account may indicate a level of overall similarity (or lack of similarity) between the account's transactions over each of the categories contained in the tables. In this manner, similarity determiner 214 determines how similar a given provider's recent transaction behavior (as indicated in short-term behavior table 212) is to the same provider's long-term behavior (as indicated in long-term behavior table 210).

In some implementations, the measure of similarity comprise a cosine similarity that outputs a value between 0 and 1. For instance, the measure of similarity may comprise a value of 1 (or close to 1) where the short-term and long-term behaviors are identical or nearly identical, and a value of 0) (or close to 0) where the short-term and long-term behaviors comprise little to no similarity. This is only one example of measuring a similarity between short-term and long-term behaviors as indicated in their respective tables. Other techniques for measuring the similarity, or otherwise scoring a similarity, between each account's transaction behavior in long-term behavior table 210 and short-term behavior table 212 are also contemplated, such as by using a neural network, machine-learning, etc. In various embodiments, the measure of similarity for each account may be outputted as a table (or other data structure) and/or may be appended to any of the tables described herein (e.g., the vocabulary table, long-term behavior table, and/or short-term behavior table).

In step 312, for each account with a corresponding measure of similarity below a threshold value, the account is identified as a fraudulent account candidate. For instance, similarity determiner 214 may be configured to identify each account that has a corresponding measure of similarity below a threshold value as a fraudulent account candidate. For example, if the threshold is configured to be 0.5 (e.g., where a cosine similarity is implemented), each account that has a corresponding measure of similarity below 0.5 may be identified as a fraudulent account candidate.

In some implementations, such accounts with a measure of similarity below the threshold may undergo further similarity analysis to determine whether the usage is likely to be fraudulent, or whether the usage is likely benign. Such analysis may comprise retrieval of additional transaction information for those accounts from transaction history DB 108 and/or application of one or more rules and heuristics. In this manner, this type of additional processing can be applied only for those accounts that are identified as potentially problematic, rather than all accounts active in system 100.

Accordingly, in example implementations, potentially fraudulent use of an account may be determined. Such fraudulent use may occur where a malicious actor gains access to a medical provider's identifier (e.g., NPI) or other credentials that are used for authorizing and/or prescribing medical services or drugs, and uses the identifier without permission. In accordance with disclosed techniques, this type of improper use may be readily identified and remediated, thereby preventing the account from engaging in further transactions.

Figure 4:
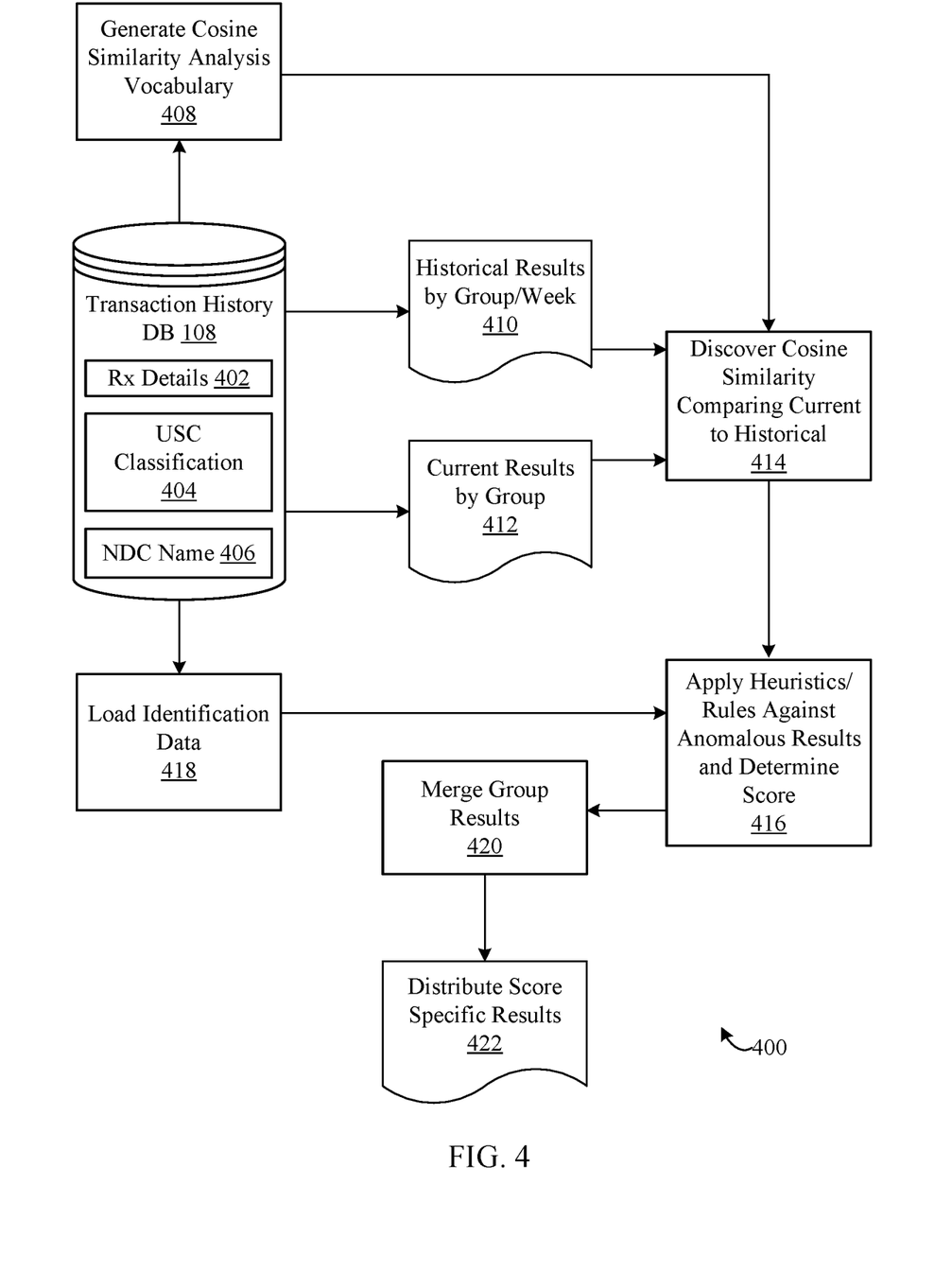
FIG. 4 shows a block diagram for discovering fraudulent accounts in a healthcare environment, in accordance with an example embodiment.

Turning now to FIG. 4, a block diagram is shown for discovering fraudulent accounts in a healthcare environment 400, in accordance with an example embodiment. In the example of FIG. 4, the discovery of fraudulent accounts is illustrated in a healthcare setting in which transactions relate to drug prescription transactions. Further structural and operational examples will be apparent to persons skilled in the relevant art(s) based on the following descriptions. Flowchart 400 is described as follows with respect to system 100 of FIG. 1 and system 200 of FIG. 2. In embodiments, one or more steps of flowchart 400 may not be performed.

An example implementation of transaction history DB 108 is shown in healthcare environment 400. Transaction history DB 108 contains a history of prescription (Rx) details 402, a Uniform System of Classification (USC) 404, and a National Drug Code (NDC) name 406. Rx details 402 contains information indicative of prescription scripts written by an individual (e.g., a medical provider) associated with a given account. In some, Rx details 402 includes one or more of an identifier (e.g., NPI) of the provider, a drug name, a drug quantity, a drug strength, a dosage, a provider location (e.g., a practice name, geographic location, address, etc.), a provider specialty, etc. In examples, the Rx details 402 may be obtained by querying the database for such information. The query may comprise querying historical data (e.g., for a long-term behavior table), querying current data (e.g., for a short-term behavior table), and/or querying identification data that may be used in a heuristics/rules phase. In one example implementation, a first query for historical data corresponding to the long-term behavior comprises querying the database for all prescriptions aggregated by drug and a corresponding account (e.g., NPI), while a second query for historical data corresponding to the short term behavior comprises querying the database for all prescriptions aggregated by drug, a corresponding account, and a provider location for the current day, week, etc. to be evaluated.

USC 404 comprises a listing (e.g., a mapping) of drugs to their respective drug classifications. For instance, a given drug may be mapped to classification of a narcotic, a non-narcotic analgesic, aspirin, antibiotic, etc. NDC 406 comprises a listing (e.g., mapping) of drugs to their respective identifiers (e.g., actual or specific names for a given drug). For instance, NDC 406 may indicate, for a given drug, a set of identification numbers that identify a labeler code (e.g., the entity that labeled or packaged a drug), a product code (e.g., strength, dosage, and/or formulation information), and a package code (e.g., package size and/or type).

By querying for such information in accordance with disclosed techniques, a provider fingerprint can be generated that takes into account a prescribing pattern for a given account. The pattern may indicate, for instance, a number of prescriptions for certain categories of drugs, an amount prescribed (e.g., quantity and/or strength) of drugs in a certain category, the provider location associated with the prescription, and various other patterns as will be appreciated to those skilled in the relevant art based on the content of transaction history DB 108.

A cosine similarity analysis vocabulary is generated 408, which may comprise a set of drug categories. In examples, the drug categories may be determined and/or aggregated from USC classification 404 and NDC name 406. In some further implementations, the cosine similarity analysis vocabulary also comprises a listing of medical provider identifiers (e.g., NPIs).

Historical results by group/week are identified 410, such as by generating a long-term behavior table as described herein. Similarly, current results by group are identified 412, such as by generating a short-term behavior table as described herein. From the historical results and the current results, a cosine similarity comparing each is discovered 414. In examples, a set of anomalous results are identified based on the discovered cosine similarities (e.g., by identifying medical provider identifiers in which the cosine similarity is below a threshold).

For each of the anomalous results, a set of heuristics and/or rules are applied and a score is assigned 416. In implementations, applying the heuristics and/or rules comprises loading additional identification data 418 relating to prescriptions associated with each medical provider identifier from transaction history 108. Stated differently, additional transactional information may be retrieved for each of the anomalous results in applying the set of heuristics and/or rules. In examples, a score or ranking is generated for each of the anomalous results based on the application of the heuristics and/or rules. The results are merged 420 and distributed 422, such as to account management system 106. In this manner, a prescribing behavior fingerprint may be generated that is indicative of the usage pattern for a given account, which enables determining whether a current behavior deviates from the fingerprint.

By comparing an account's (e.g., an NPI's) previous prescribing habits to their current prescribing patterns, example embodiments can readily and automatically flag accounts that are potentially problematic. For instance, since a malicious actor impersonating another would not know the transaction pattern (e.g., prescribing pattern) of the individual they are impersonating, differences in behavior due to the impersonation can be detected. Further, even where differences in behavior are for benign reasons (e.g., a providers switches clinics or some other reason), additional heuristics and/or rules may be implemented to avoid flagging acceptable transactional behavior as being suspicious, allowing for the focus to remain on inappropriate behaviors.

Figure 5:
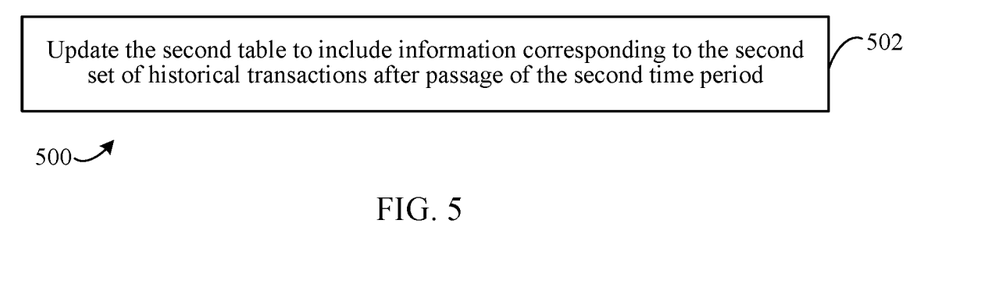
FIG. 5 shows a flowchart of a method for updating a long-term behavior table, in accordance with an example embodiment.

Turning now to FIG. 5, a flowchart 500 is shown for a method for updating a long-term behavior table, in accordance with an example embodiment. Further structural and operational examples will be apparent to persons skilled in the relevant art(s) based on the following descriptions. Flowchart 500 is described as follows with respect to system 100 of FIG. 1, system 200 of FIG. 2, and system 400 of FIG. 4.

Flowchart 500 begins with step 502. In step 502, the second table is updated to include information corresponding to the second set of historical transactions after passage of the second time period. For instance, with reference to FIG. 2, transaction aggregator 204 may update long-term behavior table 210 to include or otherwise incorporate behavior information from short-term behavior table 212 (e.g., information corresponding to a set of historical transactions in the second time period). For example, if the second time period is one week long, after short-term behavior table includes one week's worth of transaction information (e.g., based on the past current week), the information is transferred or rolled over into long-term behavior table 210. In some implementations, the information transferred to long-term behavior table 210 comprises a different degree of aggregation, in a similar manner as described above.

In some further implementations, the long-term behavior table may be configured to truncate (e.g., purge or remove) an older set of transaction information (e.g., with a length of time that is the same as the second time period) in connection with updating the long-term behavior table to include transaction information after passage of the second time period. For example, if the long-term behavior table is updated to include the most recent week of transaction information, this table may also be updated to remove the oldest week of transaction information. In this manner, the total length of time corresponding to the transaction information in the long-term behavior table may remain constant in some implementations.

In one illustration, generation of the short-term behavior table may be performed at various intervals, such as daily and/or weekly. In some examples, a subsequent generation of the short-term behavior table may comprise ingesting an additional period of time (e.g., an additional day) of transaction information, such that the short-term behavior table comprises cumulative or aggregated information (e.g., the previous day and the most recent day). Such techniques allow for the discovery of suspicious activity as it evolves throughout a given time period (e.g., a week), enabling the deactivation of fraudulent activity in a quicker fashion. The short-term behavior table may continue to include cumulative transaction information until the second period of time is reached (e.g., a week), upon which the long-term behavior table may be updated with the information from the short-term behavior table, and the short-term behavior table is reset.

Upon generation of the short-term behavior table at each interval, a cosine similarity analysis may be performed with respect to the long-term behavior table to identify potential fraudulent accounts, as described herein. In some implementations, different thresholds, heuristics, and/or rules may be applied depending on the length of time encompassed by the transactions in the short-term behavior table. In this manner, potential fraudulent accounts may be readily identified at various intervals (e.g., each day). Such techniques will allow abnormal behaviors to be detected as time goes on and behaviors deviate more from the normal behaviors. In some further implementations, a subsequent cosine similarity for an account may be compared with a previously generated cosine similarity to identify a trend (e.g., to determine whether behaviors are continuing to deviate from the normal over time).

Figure 6:
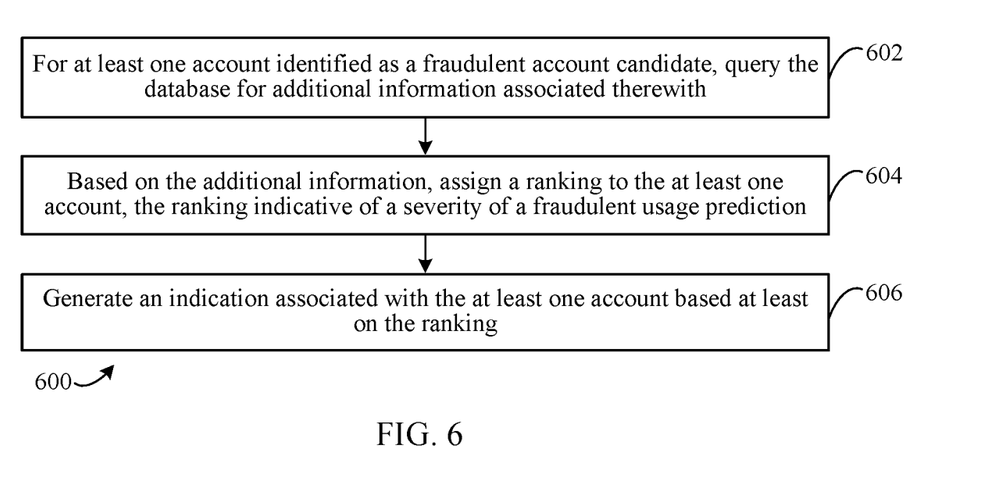
FIG. 6 shows a flowchart of a method for ranking a fraudulent account candidate, in accordance with an example embodiment.

Turning now to FIG. 6, a flowchart 600 is shown for a method for ranking a fraudulent account candidate, in accordance with an example embodiment. Further structural and operational examples will be apparent to persons skilled in the relevant art(s) based on the following descriptions. Flowchart 600 is described as follows with respect to system 100 of FIG. 1, system 200 of FIG. 2, and system 400 of FIG. 4.

Flowchart 600 begins with step 602. In step 602, for at least one account identified as a fraudulent account candidate, the database is queried for additional information associated therewith. For instance, with reference to FIG. 2, similarity analyzer 216 may query transaction history DB 108 for additional information associated with at least one account identified as a fraudulent account candidate. The additional information comprises one or more details associated with the account and/or one or more transactions executed by the account. For example, in the context of a drug prescriber account, such additional information may include, but is not limited to, additional USC information and/or NDC code information for one or more transactions associated with the account, provider location information, provider specialty information, a provider clinic identifier (e.g., a clinic name), therapeutic classes for the medications prescribed, medication quantities (e.g., amount and/or strength), etc. These are only illustrative, and other types of information may be obtained in accordance with disclosed techniques.

In step 604, based on the additional information, a ranking is assigned to the at least one account, the ranking indicative of a severity of a fraudulent usage prediction. For instance, with reference to FIG. 2, similarity analyzer 216 may apply one or more heuristics and/or rules to assign a ranking to the at least one account identified as a fraudulent account candidate. In examples, the ranking is indicative of a severity or likelihood that the usage of the account is fraudulent (e.g., the account is being impersonated). In an implementation, the ranking comprises one of a plurality of levels, from least likely to be the result of fraudulent behavior to most likely to be the result of fraudulent behavior.

The heuristics and/or rules may be applied in various ways. For instance, where the measure of similarity indicates little to no overlap between a provider's fingerprint and current behavior (e.g., a cosine similarity of zero or close to zero), a determination may be made that the account is likely being impersonated and a high severity ranking may be assigned. In other examples, provider specialty and/or clinic information may be analyzed to determine the ranking. For instance, if the provider specialty and/or clinic information is absent from certain transactions, a severity ranking may be assigned indicating that the account is possibly being used fraudulently. In other examples, such as where a provider has switched practice locations, a ranking may be assigned indicating that the account is likely not fraudulent. Based on the ranking, In some implementations, one or more machine-learning algorithms may be applied to assign the ranking. For instance, once fraudulent account candidates are identified (e.g., those accounts with a similarity below a threshold), one or more machine-learning models may be applied to identify whether the candidate is likely an account that is being impersonated, or is a false positive. In some implementations, such models may be trained and/or updated based on administrator feedback (e.g., indicating whether a fraudulent account candidate is a true positive or a false positive). These examples are only illustrative, and various other techniques may be implemented in accordance with the disclosed techniques.

In step 606, an indication associated with the at least one account is generated based at least on the ranking. For instance, with reference to FIG. 2, based on the ranking, remediation action determiner 218 may be configured to generate an indication associated with the account. The indication may comprise a notification provided to account management system 106 (e.g., for presentation in a user interface, enabling an administrator to review the fraudulent account candidate), a signal to deactivate the account (e.g., automatically), an indication that no further action should be taken (e.g., based on a determination that an account is not likely being used fraudulently), or any other type of notification or indication.

III. Further Example Embodiments and Advantages

As described, systems and devices embodying the techniques herein may be configured and enabled in various ways to perform their respective functions. In some example embodiments, one or more of the operations of the flowcharts and/or flow diagrams described herein may not be performed. Moreover, operations in addition to or in lieu of the operations of the flowcharts and/or flow diagrams described herein may be performed. Further, in some example embodiments, one or more of the operations of the flowcharts and/or flow diagrams described herein may be performed out of order, in an alternate sequence, or partially (or completely) concurrently with each other or with other operations.

Embodiments and techniques, including methods, described herein may be performed in various ways such as, but not limited to, being implemented by hardware, or hardware combined with one or both of software and firmware. As described herein, systems, devices, components, etc., of the embodiments that are configured to perform functions and/or operations are also contemplated as performing such functions and/or operations.

IV. Example Processing Device Implementations

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including but not limited to, system 100 in FIG. 1 and system 200 in FIG. 2, along with any components and/or subcomponents thereof, as well any operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), an application specific integrated circuit (ASIC), a trusted platform module (TPM), and/or the like. A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions. In embodiments with respect to the example computer implementations in this Section, main memory, memory cards and memory sticks, memory devices, and/or the like may include and or implement the described techniques and embodiments.

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

Figure 7:
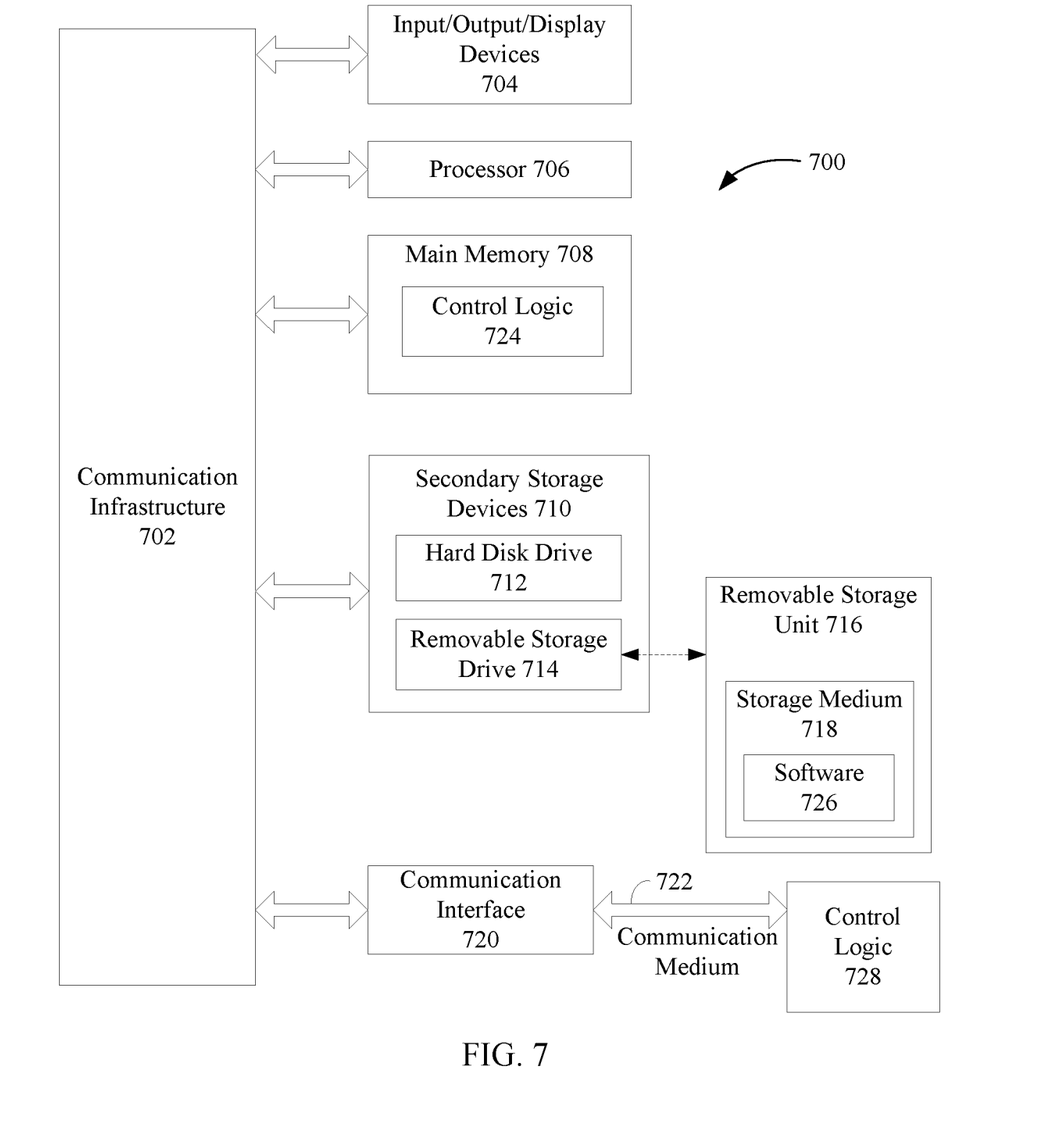
FIG. 7 shows a block diagram of a processing device/system in which the techniques disclosed herein may be performed and the embodiments herein may be utilized.

The embodiments described herein, including devices, systems, methods/processes, and/or apparatuses, may be implemented in or using processing devices, communication systems, servers, and/or, computers, such as a processing device 700 shown in FIG. 7. It should be noted that processing device 700 may represent mobile devices, communication devices/systems, entertainment systems/devices, processing devices, and/or traditional computers in one or more embodiments. For example, a system as described herein, and any of the sub-systems and/or components respectively contained therein and/or associated therewith, along with further embodiments thereof, may be implemented in or using one or more processing devices 700 and/or similar computing devices.

Processing device 700 can be any commercially available and well known communication device, processing device, and/or computer capable of performing the functions described herein, such as devices/computers available from International Business Machines®, Apple®, Sun®, HP®, Dell®, Cray®, Samsung®, Nokia®, etc. Processing device 700 may be any type of computer, including a desktop computer, a server, etc., and may be a computing device or system within another device or system.

Processing device 700 includes one or more processors (also called central processing units, or CPUs), such as a processor 706. Processor 706 is connected to a communication infrastructure 702, such as a communication bus. In some embodiments, processor 706 can simultaneously operate multiple computing threads, and in some embodiments, processor 706 may comprise one or more processors.

Processing device 700 also includes a primary or main memory 708, such as random access memory (RAM). Main memory 708 has stored therein control logic 724 (computer software), and data.

Processing device 700 also includes one or more secondary storage devices 710. Secondary storage devices 710 include, for example, a hard disk drive 712 and/or a removable storage device or drive 714, as well as other types of storage devices, such as memory cards and memory sticks. For instance, processing device 700 may include an industry standard interface, such a universal serial bus (USB) interface for interfacing with devices such as a memory stick. Removable storage drive 714 represents a floppy disk drive, a magnetic tape drive, a compact disk drive, an optical storage device, tape backup, etc.

Removable storage drive 714 interacts with a removable storage unit 716. Removable storage unit 716 includes a computer useable or readable storage medium 718 having stored therein computer software 726 (control logic) and/or data. Removable storage unit 716 represents a floppy disk, magnetic tape, compact disk, DVD, optical storage disk, or any other computer data storage device. Removable storage drive 714 reads from and/or writes to removable storage unit 716 in a well-known manner.

Processing device 700 also includes input/output/display devices 704, such as touchscreens, LED and LCD displays, monitors, keyboards, pointing devices, etc.

Processing device 700 further includes a communication or network interface 720. Communication interface 720 enables processing device 700 to communicate with remote devices. For example, communication interface 720 allows processing device 700 to communicate over communication networks or mediums 722 (representing a form of a computer useable or readable medium), such as LANs, WANs, the Internet, etc. Network interface 720 may interface with remote sites or networks via wired or wireless connections.

Control logic 728 may be transmitted to and from processing device 700 via the communication medium 722.

Any apparatus or manufacture comprising a computer useable or readable medium having control logic (software) stored therein is referred to herein as a computer program product or program storage device. This includes, but is not limited to, processing device 700, main memory 708, secondary storage devices 710, and removable storage unit 716. Such computer program products, having control logic stored therein that, when executed by one or more data processing devices, cause such data processing devices to operate as described herein, represent embodiments.

Techniques, including methods, and embodiments described herein may be implemented by hardware (digital and/or analog) or a combination of hardware with one or both of software and/or firmware. Techniques described herein may be implemented by one or more components. Embodiments may comprise computer program products comprising logic (e.g., in the form of program code or software as well as firmware) stored on any computer useable medium, which may be integrated in or separate from other components. Such program code, when executed by one or more processor circuits, causes a device to operate as described herein. Devices in which embodiments may be implemented may include storage, such as storage drives, memory devices, and further types of physical hardware computer-readable storage media. Examples of such computer-readable storage media include, a hard disk, a removable magnetic disk, a removable optical disk, flash memory cards, digital video disks, random access memories (RAMs), read only memories (ROM), and other types of physical hardware storage media. In greater detail, examples of such computer-readable storage media include, but are not limited to, a hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, flash memory cards, digital video discs, RAM devices, ROM devices, and further types of physical hardware storage media. Such computer-readable storage media may, for example, store computer program logic, e.g., program modules, comprising computer executable instructions that, when executed by one or more processor circuits, provide and/or maintain one or more aspects of functionality described herein with reference to the figures, as well as any and all components, capabilities, and functions therein and/or further embodiments described herein.

Such computer-readable storage media are distinguished from and non-overlapping with communication media and modulated data signals (i.e., do not include communication media or modulated data signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media and signals transmitted over wired media. Embodiments are also directed to such communication media.

The techniques and embodiments described herein may be implemented as, or in, various types of circuits, devices, apparatuses, and systems. For instance, embodiments may be included, without limitation, in processing devices (e.g., illustrated in FIG. 7) such as computers and servers, as well as communication systems such as switches, routers, gateways, and/or the like, communication devices such as smart phones, home electronics, gaming consoles, entertainment devices/systems, etc. A device, as defined herein, is a machine or manufacture as defined by 35 U.S.C. § 101. That is, as used herein, the term "device" refers to a machine or other tangible, manufactured object and excludes software and signals. Devices may include digital circuits, analog circuits, or a combination thereof. Devices may include one or more processor circuits (e.g., central processing units (CPUs), processor 706 of FIG. 7), microprocessors, digital signal processors (DSPs), and further types of physical hardware processor circuits) and/or may be implemented with any semiconductor technology in a semiconductor material, including one or more of a Bipolar Junction Transistor (BJT), a heterojunction bipolar transistor (HBT), a metal oxide field effect transistor (MOSFET) device, a metal semiconductor field effect transistor (MESFET) or other transconductor or transistor technology device. Such devices may use the same or alternative configurations other than the configuration illustrated in embodiments presented herein.

V. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A computing system for discovering fraudulent account usage, comprising:
   at least one memory device that store executable program code; and
   a processing system, comprising at least one processor, configured to receive and execute the program code to:
      query a database to identify a list of accounts and transaction categories, the database comprising a history of transactions associated with each of the accounts;
      generate a first table based on the transaction categories, the first table comprising an account identifier corresponding to each account in the list of accounts;
      generate a second table by populating the first table with a first set of historical transactions associated with each of the account identifiers across each of the transaction categories over a first period of time;
      generate a third table by populating the first table based at least on a response to querying the database for a second set of historical transactions associated with each of the account identifiers across each of the transaction categories over a second period of time;
      for each of the account identifiers, generate a measure of similarity between the first set of historical transactions in the first table associated with the account identifier and the second set of historical transactions associated with the account identifier in the third table; and
      for each account identifier with a corresponding measure of similarity below a threshold value, identify the account identifier as a fraudulent account candidate.

2. The computing system of claim 1, wherein the transaction categories are aggregated from a list of drug classifications and drug names,
   wherein the list of accounts comprises a list of drug prescriber accounts, and
   wherein the historical transactions comprise prescriptions associated with one or more of the list of drug prescriber accounts.

3. The computing system of claim 1, wherein the second time period is shorter than and non-overlapping with the first time period.

4. The computing system of claim 1, wherein the second set of historical transactions comprises transactions that occurred over a plurality of days.

5. The computing system of claim 1, wherein the processing system is further configured to execute the program code to:
update the second table to include information corresponding to the second set of historical transactions after passage of the second time period.

6. The computing system of claim 5, wherein the processing system is further configured to execute the program code to:
update the second table to remove information corresponding to an oldest set of transactions.

7. The computing system of claim 1, wherein the processing system is further configured to execute the program code to:
for at least one account identifier identified as a fraudulent account candidate, query the database for additional information associated therewith;
based on the additional information, assign a ranking to the at least one account identifier, the ranking indicative of a severity of a fraudulent usage prediction; and
generate an indication associated with the at least one account identifier based at least on the ranking.

8. The computing system of claim 1, wherein the processing system is further configured to execute the program code to:
deactivate at least one account associated with the fraudulent account identifier identified as a fraudulent account candidate based at least on the measure of similarity associated therewith.

9. A method performed by a computing system for discovering fraudulent account usage, comprising:
querying a database to identify a list of accounts and transaction categories, the database comprising a history of transactions associated with each of the accounts;
generating a first table based on the transaction categories, the first table comprising an account identifier corresponding to each account in the list of accounts;
generating a second table by populating the first table with a first set of historical transactions associated with each of the account identifiers across each of the transaction categories over a first period of time;
generating a third table by populating the first table based at least on a response to querying the database for a second set of historical transactions associated with each of the account identifiers across each of the transaction categories over a second period of time;
for each of the account identifiers, generating a measure of similarity between the first set of historical transactions in the first table associated with the account identifier and the second set of historical transactions associated with the account identifier in the third table; and
for each account identifier with a corresponding measure of similarity below a threshold value, identifying the account identifier as a fraudulent account candidate.

10. The method of claim 9, wherein the transaction categories are aggregated from a list of drug classifications and drug names,
wherein the list of accounts comprises a list of drug prescriber accounts, and
wherein the historical transactions comprise prescriptions associated with one or more of the list of drug prescriber accounts.

11. The method of claim 9, wherein the second time period is shorter than and non-overlapping with the first time period.

12. The method of claim 9, further comprising:
updating the second table to include information corresponding to the second set of historical transactions after passage of the second time period.

13. The method of claim 12, further comprising:
updating the second table to remove information corresponding to an oldest set of transactions.

14. The method of claim 9, further comprising:
for at least one account identifier identified as a fraudulent account candidate, querying the database for additional information associated therewith;
based on the additional information, assigning a ranking to the at least one account identifier, the ranking indicative of a severity of a fraudulent usage prediction; and
generating an indication associated with the at least one account identifier based at least on the ranking.

15. The method of claim 9, further comprising:
deactivating at least one account identifier identified as a fraudulent account candidate based at least on the measure of similarity associated therewith.

16. A computer-readable storage medium having program instructions encoded thereon that are executable by one or more processors to perform a computer-implemented method, the method comprising:
querying a database to identify a list of accounts and transaction categories, the database comprising a history of transactions associated with each of the accounts;
generating a first table based on the transaction categories, the first table comprising an account identifier corresponding to each account in the list of accounts;
generating a second table by populating the first table with a first set of historical transactions associated with each of the account identifiers across each of the transaction categories over a first period of time;
generating a third table by populating the first table based at least on a response to querying the database for a second set of historical transactions associated with each of the account identifiers across each of the transaction categories over a second period of time;
for each of the account identifiers, generating a measure of similarity between the first set of historical transactions in the first table associated with the account identifier and the second set of historical transactions associated with the account identifier in the third table; and
for each account identifier with a corresponding measure of similarity below a threshold value, identifying the account identifier as a fraudulent account candidate.

17. The computer-readable storage medium of claim 16, wherein the transaction categories are aggregated from a list of drug classifications and drug names,
wherein the list of accounts comprises a list of drug prescriber accounts, and
wherein the historical transactions comprise prescriptions associated with one or more of the list of drug prescriber accounts.

18. The computer-readable storage medium of claim 16, wherein the method further comprises:
updating the second table to include information corresponding to the second set of historical transactions after passage of the second time period.

19. The computer-readable storage medium of claim 18, wherein the method further comprises:
updating the second table to remove information corresponding to an oldest set of transactions.

20. The computer-readable storage medium of claim 16, wherein the method further comprises:
- for at least one account identifier identified as a fraudulent account candidate, querying the database for additional information associated therewith;
- based on the additional information, assigning a ranking to the at least one account identifier, the ranking indicative of a severity of a fraudulent usage prediction; and
- generating an indication associated with the at least one account identifier based at least on the ranking.

* * * * *